US012574887B2

(12) United States Patent
Mohan et al.

(10) Patent No.: US 12,574,887 B2
(45) Date of Patent: Mar. 10, 2026

(54) LOCATIONING ACCURACY AND ANALYTICS OF WIRELESS DEVICES

(71) Applicant: Fortinet, Inc., Sunnyvale, CA (US)

(72) Inventors: Pradeep Mohan, Bangalore (IN);
Karthikeyan Rajendiran, Bangalore (IN)

(73) Assignee: Fortinet. Inc., Sunnyvale, CA (US)

( * ) Notice: Subject to any disclaimer, the term of this patent is extended or adjusted under 35 U.S.C. 154(b) by 531 days.

(21) Appl. No.: 18/129,045

(22) Filed: Mar. 30, 2023

(65) Prior Publication Data

US 2024/0334369 A1     Oct. 3, 2024

(51) Int. Cl.
*H04W 24/10*         (2009.01)
*H04W 64/00*         (2009.01)
(52) U.S. Cl.
CPC ........... *H04W 64/00* (2013.01); *H04W 24/10* (2013.01)

(58) Field of Classification Search
CPC .............................. H04W 64/00; H04W 24/10
See application file for complete search history.

(56) References Cited

U.S. PATENT DOCUMENTS

2015/0245167 A1* 8/2015 Bobrow .................. H04W 4/80
                                                    455/41.2
2022/0248364 A1* 8/2022 Stager ................... H04W 8/005

* cited by examiner

*Primary Examiner* — Chuong A Ngo
(74) *Attorney, Agent, or Firm* — Law Office of Dorian Cartwright; Dorian Cartwright

(57) ABSTRACT

A plurality of access points synch with a first synch event to establish a first predefined time interval for periodically sending STA reports. Responsive to detecting the new access point, each of the plurality of access points is resynched by sending a second sync event to establish a second predefined time interval for periodically sending STA reports. A real-time mapping can be displayed of the station using a first location at a first instance, as initially synched, and a second location at the second instance, as resynched.

7 Claims, 6 Drawing Sheets

LOCATIONING SERVER
110

Mapping Module
210

Synching Module
220

STA Reporting Module
230

STA Tracking Module
240

START

RECEIVE LOCATION COORDINATES FOR
EACH OF THE ACCESS POINTS
_310_

MAINTAIN SYNCH OF ACCESS POINTS TO
ACCURATELY TRACK STATION LOCATIONS
_320 (SEE FIG. 4)_

MAP STATION USING LOCATIONS FROM
SYNCHING AND RESYNCHING
_330_

END

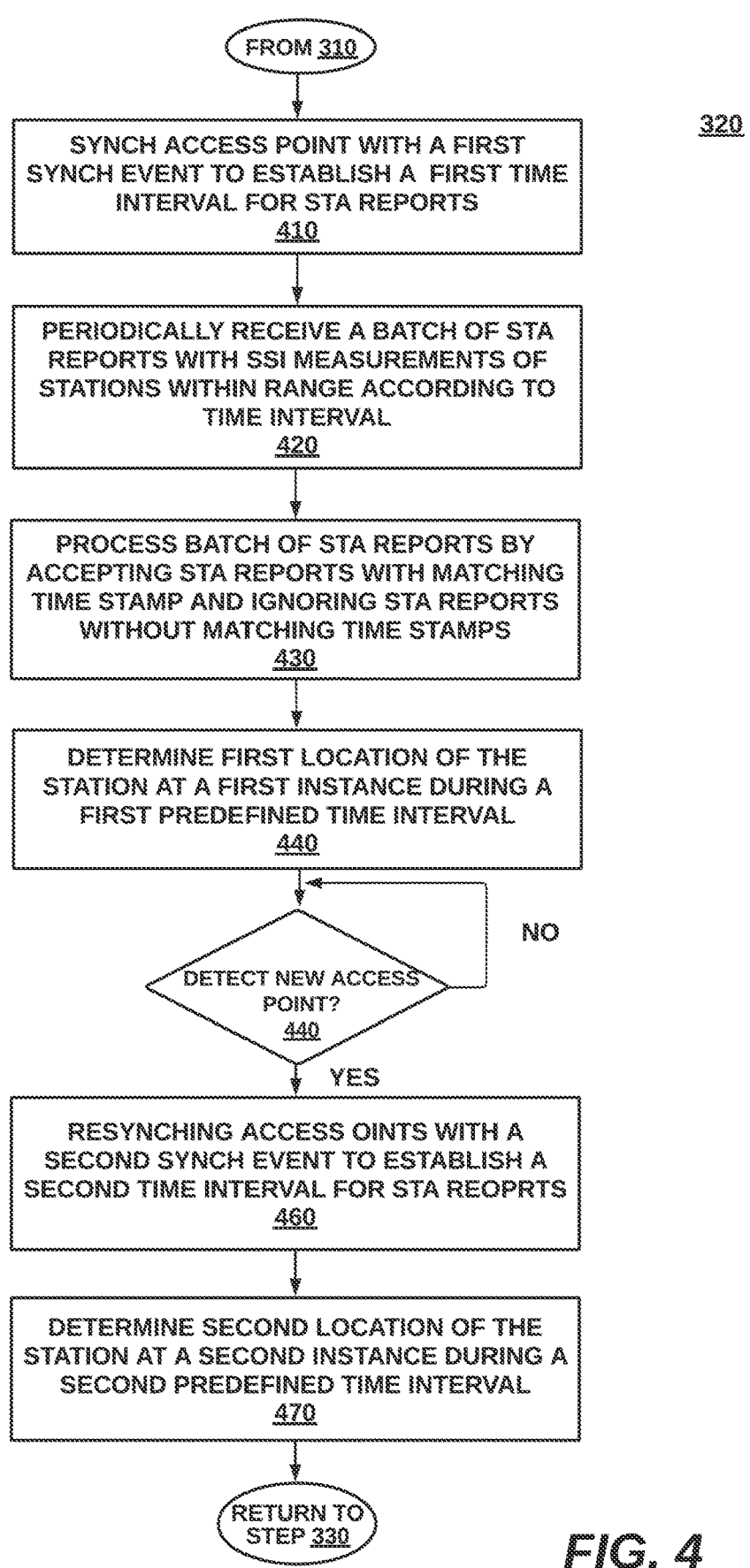

FROM 310

320

SYNCH ACCESS POINT WITH A FIRST SYNCH EVENT TO ESTABLISH A FIRST TIME INTERVAL FOR STA REPORTS
410

PERIODICALLY RECEIVE A BATCH OF STA REPORTS WITH SSI MEASUREMENTS OF STATIONS WITHIN RANGE ACCORDING TO TIME INTERVAL
420

PROCESS BATCH OF STA REPORTS BY ACCEPTING STA REPORTS WITH MATCHING TIME STAMP AND IGNORING STA REPORTS WITHOUT MATCHING TIME STAMPS
430

DETERMINE FIRST LOCATION OF THE STATION AT A FIRST INSTANCE DURING A FIRST PREDEFINED TIME INTERVAL
440

DETECT NEW ACCESS POINT?
440

NO

YES

RESYNCHING ACCESS OINTS WITH A SECOND SYNCH EVENT TO ESTABLISH A SECOND TIME INTERVAL FOR STA REOPRTS
460

DETERMINE SECOND LOCATION OF THE STATION AT A SECOND INSTANCE DURING A SECOND PREDEFINED TIME INTERVAL
470

RETURN TO STEP 330

*FIG. 4*

LOCATIONING ACCURACY AND ANALYTICS OF WIRELESS DEVICES

FIELD OF THE INVENTION

The invention relates generally to computer networks, and more specifically, to synching a plurality of access points to accurately track locations of stations within a combined RF range of the plurality of access points.

BACKGROUND

With the advent and evolution of technology, there has been a surge in the use of mobile and IoT devices across the globe. Businesses such as malls, retail stores, airports, exhibition, convention centers and the like, aim to make use of these technologies to provide an enriching user experience to customers who visit their premises and also understand customer behavior with the help of data analytics solutions.

Data analytics solutions take advantage of the Wi-Fi/Bluetooth technology capabilities in mobile/IoT devices to build a business use case providing insights on number of visitors (new, repeat), age, gender, device/OS type among other information helping businesses understand and adapt accordingly.

Locationing provides information about users drilled down to the area level which helps businesses understand the more popular areas or sections within their premises providing them insights in marketing their products accordingly or revamp the areas to as to not overcrowd particular spots etc. Locationing can be based on the probe requests received from the Wi-Fi devices. A single Wi-Fi device can send a probe request which can be seen by multiple Wi-Fi access points. Station (STA) reports contain information of all the STAs discovered every, for example, 5 seconds. Accurate locationing works on the premise that all APs across the network will be in sync and send the packets every 5 seconds.

Problematically, there will be new access points added to the network or access points going for a reboot/crash which leads to a scenario where the new access points or rebooted/crashed access points once they are on the network to send STA packets out of sync with the other access points. Overall, this leads to incorrect locationing and analytics of a Wi-Fi device leading to false data on locationing as well as movements within the premises. With large numbers access points, such as hundreds or thousands, maintaining synchronization, and thus, accuracy, is can cause unacceptable delays and performance issues.

What is needed is a robust technique for synching a plurality of access points to accurately track locations of stations within a combined RF range of the plurality of access points.

SUMMARY

To meet the above-described needs, methods, computer program products, and systems for synching a plurality of access points to accurately track locations of stations within a combined RF range of the plurality of access points.

In one embodiment, a plurality of access points synch with a first synch event to establish a first predefined time interval for periodically sending STA reports. A batch of STA reports are periodically received from the plurality of access points according the first predefined time interval, wherein each of the STA reports includes a time stamp. A list of MAC addresses for stations within RF range and an SSI value measured for each of the stations.

In another embodiment, a first location of a station, at the first instance, from the processed batch of STA reports based on SSI values. A new access point joins the plurality of access points, wherein the station is within RF range of the new access point. Responsive to detecting the new access point, each of the plurality of access points is resynched by sending a second sync event to establish a second predefined time interval for periodically sending STA reports.

In still another embodiment, a second location of the station, at a second instance of the second predefined time interval. A real-time mapping can be displayed of the station using a first location at the first instance and a second location at the second instance. Location-based analytics can be performed using the locations and time stamps.

Advantageously, network performance and computer performance are improved with more accurate locationing and analytics.

BRIEF DESCRIPTION OF THE DRAWINGS

In the following drawings, like reference numbers are used to refer to like elements. Although the following figures depict various examples of the invention, the invention is not limited to the examples depicted in the figures.

Figure 2:
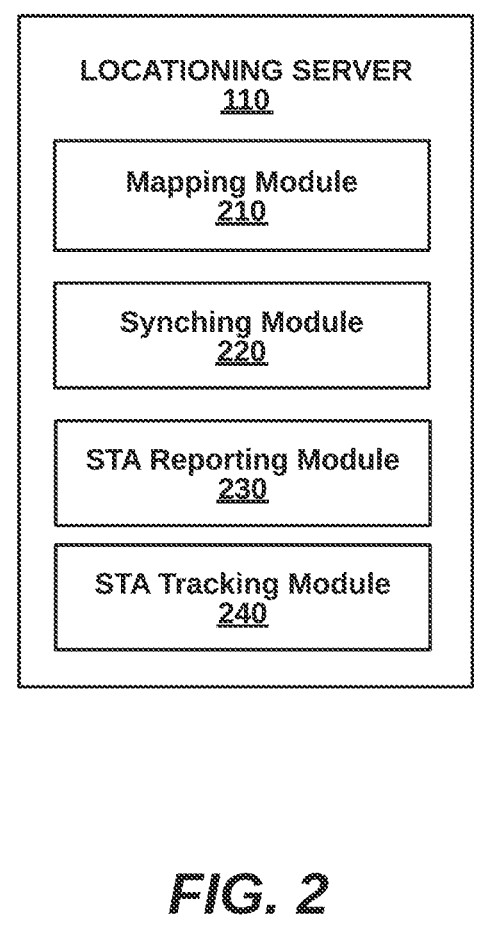

FIG. 2 is a more detailed block diagram illustrating a locationing server of the system of FIGS. 1A and 1B, according to one embodiment.

FIG. 4 is a more detailed flow diagram illustrating a step for generating an adaptive TTL model from past connection events, from the method of FIG. 3, according to one embodiment.

DETAILED DESCRIPTION

Methods, computer program products, and systems for synching a plurality of access points to accurately track locations of stations within a combined RF range of the plurality of access points. One of ordinary skill in the art will recognize many alternative embodiments that are not explicitly listed based on the following disclosure.

I. Systems for Access Point Synching for Locationing (FIGS. 1-2)

Figure 1A:
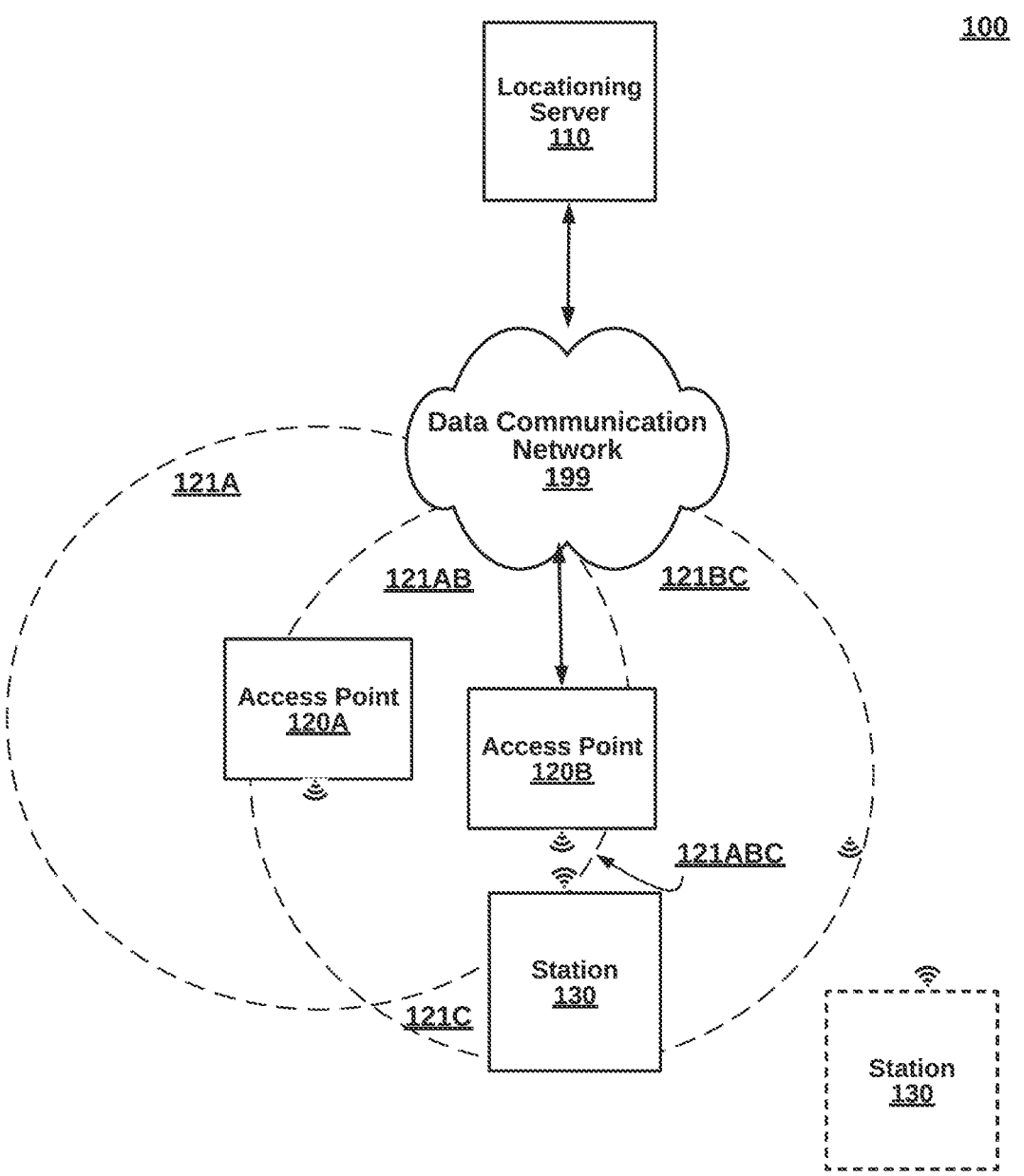
FIG. 1A is a high-level block diagram illustrating a system for synching a plurality of access points to accurately track locations of stations within a combined radio frequency (RF) range of the plurality of access points, at a first instance, according to one embodiment.
Figure 1B:
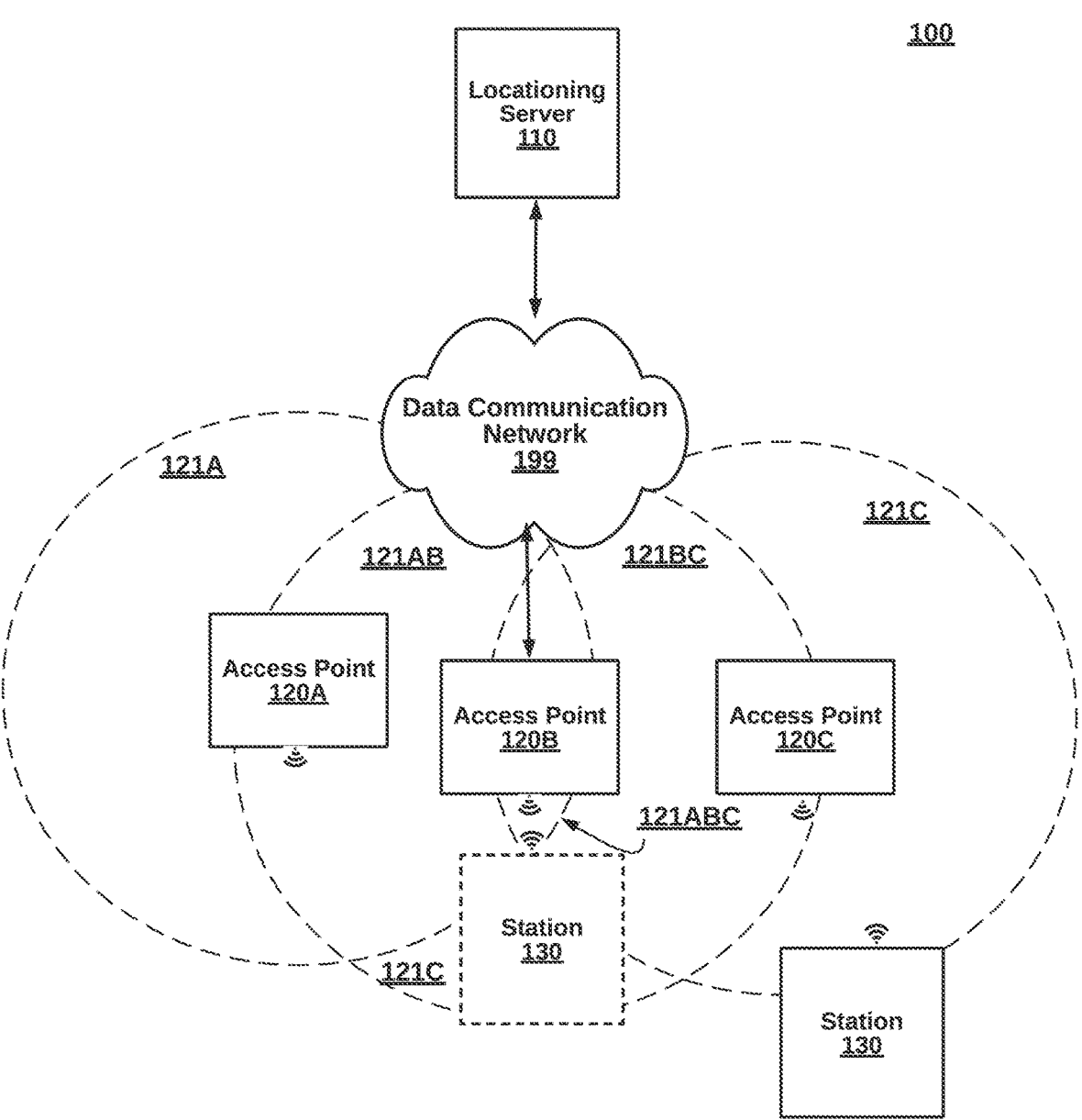
FIG. 1B is a high-level block diagram illustrating a system for synching a plurality of access points to accurately track locations of stations within a combined radio frequency (RF) range of the plurality of access points, at a second instance, according to one embodiment.

FIGS. 1A and 1B is a high-level block diagram illustrating a system 100 for synching a plurality of access points to accurately track locations of stations within a combined RF range of the plurality of access points, according to one embodiment. The system 100 includes a locationing server 110, a plurality of access points 120A-C and a station 130.

Figure 5:
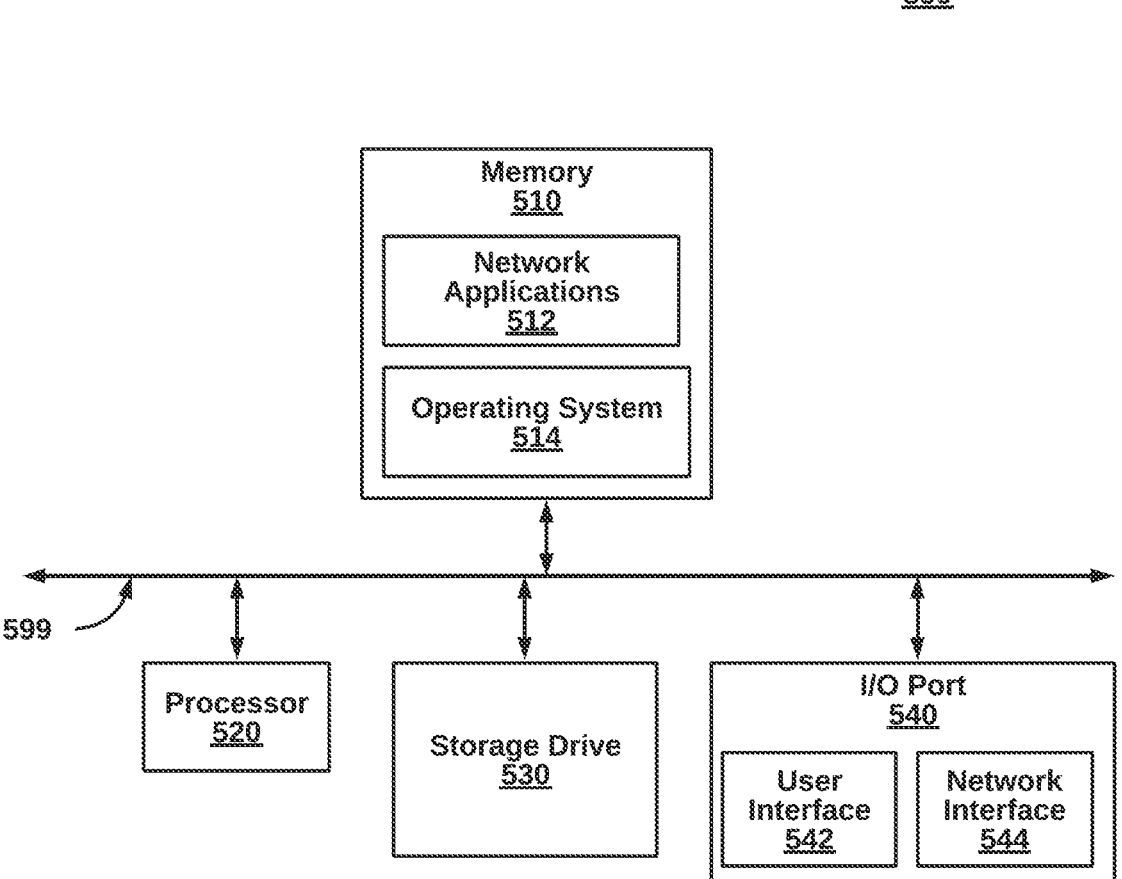
FIG. 5 is a block diagram illustrating an example computing device for the system of FIGS. 1A and 1B, according to one embodiment.

Other embodiments of the system 100 can include components that are not shown in FIGS. 1A and 1B, such as controllers, network gateways, firewalls, additional access points and stations. The components of system 100 can be implemented in hardware, software, or a combination of both. An example implementation is shown in FIG. 5.

In one embodiment, the components of the automatic system 100 are coupled in communication over a private network connected to a public network, such as the Internet. In another embodiment, system 100 is an isolated, private network. The components can be connected to the data communication system via hard wire (e.g., locationing server 110). The components can also be connected via wireless networking (e.g., access points 120A-C). The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPV4 or IPV6 address spaces.

The locationing server 110 uses resynching to maintain accurate locations of the station 130 and other stations. The access points 120A-C sent STA reports to locationing server 110 during predefined intervals, such a every 5 seconds. Based on SSI values of the STA reports, stations can be mapped for display. In an embodiment, when a new access point is detected, access points 120A-C are resynched along with the new access point, as described herein. As a result, station locations remain accurate. Another embodiment of the locationing server includes data analytics associated with stations and can be used to power marketing opportunities, mapping information, augmented reality and other applications.

The locationing server 110 can be connected locally, belonging to the same enterprise network as access points 120A-C. The locationing server 110 can also connect over the cloud remotely, and be operated by a third party.

The access points 120A-C sent STA reports to the locationing server 110 with measured SSI values. From time to time, the station 130 and other stations send out probe requests from which SSI values can be derived. Other packets can also be listened to for deriving SSI values. Generally, the access points 120A-C use RF communications to wirelessly receive and send data packets. FIGS. 1A and 1B show RF ranges 121A, 121B, 121C corresponding to RF antennae of access point 120A, 120B and 120C, accordingly. In some areas, the RF ranges overlap, such as between access point 120A and access point 120B at range 121AB, between access point 120B and access point 120C at range 121BC, and between all three access points 120A-C at range 121ABC. Overlapping areas provide multiple readings, such as two SSI values or three SSI values for full triangulation, while nonoverlapping areas provide a single reading.

The station 130, responsive to beacons received from access points, can send out a probe request frame to request a connection. After connecting, additional data packets are also sent out and can be observed by any access point within range, even if not an intended destination. In FIG. 1A, station 130 is shown at a first instance within range 121ABC, in FIG. 1B and at a second instance within range 121C. At the first instance, access point 120C was not online, and thus, the system 100 had to resync in between the first and second instances.

FIG. 2 is a more detailed block diagram illustrating the network device manager 120 of the system of FIGS. 1A and 1B, according to one embodiment. The network device 110 includes a mapping module 210, a synching module 220, STA reporting module 230, and an STA tracking module 240. The components can be implemented in hardware, software, or a combination of both.

The mapping module 210 displays a real-time mapping of the station using a first location at the first instance and a second location at the second instance. To do so, the mapping module 210 can receive location coordinates for each of a plurality of access points. In one example, GPS coordinates are automatically captured and sent from each access point. In another example, coordinates are manually determined and entered. Additionally, solid structures such as walls and furniture can be displayed. A first instance shows a specific point or range at a first time and a second instance shows a specific point or range at a second time, deriving motion trajectories and velocities for stations.

The STA tracking module 240 can determine a first location of a station, at the first instance, from the processed batch of STA reports based on SSI values. The STA tracking module 240 determines a second location of the station, at a second instance of the second predefined time interval. The station can be tracked for various periods of time and there can be many other stations tracked at the same time. More specifically, in one embodiment, SSI values measure at different access points for the same station determine coordinates for the station to be displayed relative to the access point mapping. With a single SSI value, a radius is established and a circle of possible locations can be displayed. With a second SSI value, a plane is established and a line of possible locations can be displayed. Preferably, with a third SSI value, a point is established and a specific location can be displayed. In some embodiments, there is a margin of error resulting in a corresponding boundary around the estimated location point.

The STA reporting module 230 to periodically receiving a batch of STA reports from the plurality of access points according the first predefined time interval, wherein each of the STA reports includes a time stamp, a list of MAC addresses for stations within RF range and an SSI value measured for each of the stations. The STA reporting module 230 processes the batch of STA reports for a specific instance of the first predefined time interval, including accepting STA reports having a time stamp that matches the predefined time interval of the first instance, and disregarding STA reports having a time stamp that does not match the predefined time interval of the first instance.

The synching module 220 to synch the plurality of access points with a first synch event to establish a first predefined time interval for periodically sending STA reports. The synching module 220 detects a new access point joining the plurality of access points, wherein the station is within RF range of the new access point. The synching module 220, responsive to detecting the new access point, resynchs each of the plurality of access points, including sending a second sync event to establish a second predefined time interval for periodically sending STA reports.

II. Methods for Access Point Synching for Locationing (FIGS. 3-5)

Figure 3:
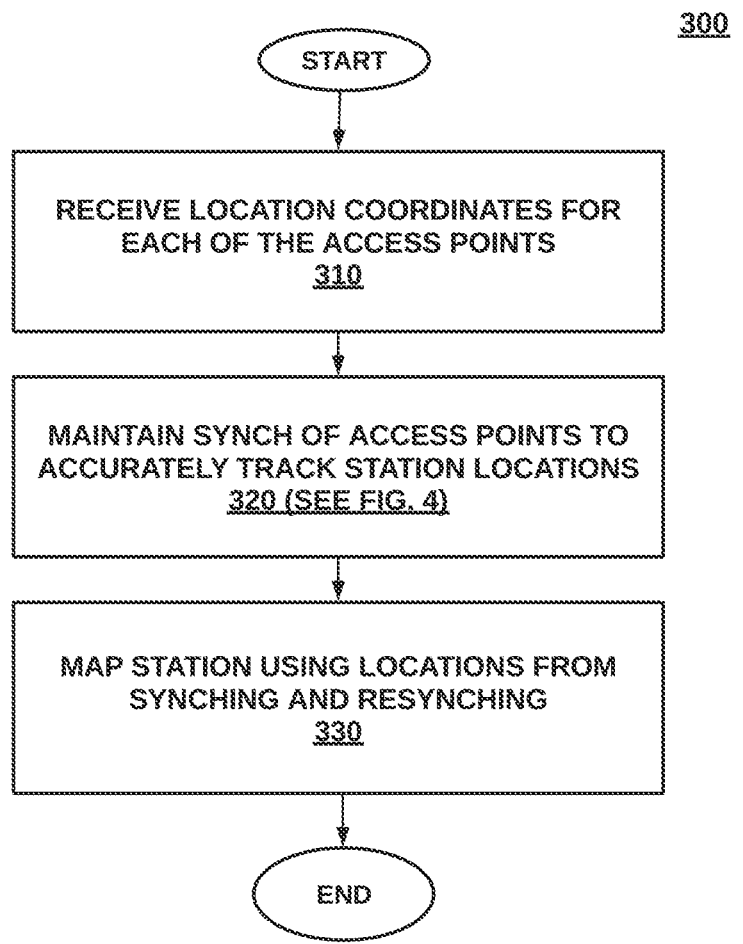
FIG. 3 is a high-level flow diagram illustrating a method for synching a plurality of access points to accurately track locations of stations within a combined RF range of the plurality of access points, according to an embodiment.

FIG. 3 is a high-level flow diagram for tracking station locations with access points, in an embodiment. The method 300 can be implemented by, for example, system 100 of FIG. 1. The specific grouping of functionalities and order of steps are a mere example as many other variations of method 300 are possible, within the spirit of the present disclosure. The method 300 can be performed by, for example, the system 100.

At step 310, receiving location coordinates for each of the plurality of access points. At step 320, synching for a plurality of access points is maintained to accurately track locations of stations within a combined RF range of the plurality of access points, as described below in FIG. 4. At step 330, a real-time mapping of the station using a first location at the first instance, from initial synching, and a second location at the second instance, from resynching. Resynching can occur multiple times.

FIG. 4 provides further details concerning the step 330 of FIG. 4 for maintaining synching between a plurality of access point to accurately track locations of stations within a combined RF range of the plurality of access points.

In more detail, at step 410, the plurality of access points is synched with a first synch event to establish a first predefined time interval for periodically sending STA reports.

At step 420, a batch of STA reports is periodically received from the plurality of access points according the first predefined time interval. Each of the STA reports includes a time stamp, a list of MAC addresses for stations within RF range and an SSI value measured for each of the stations.

At step 430, each the batch of STA reports is processed for a specific instance of the first predefined time interval, including accepting STA reports having a time stamp that matches the predefined time interval of the first instance, and disregarding STA reports having a time stamp that does not match the predefined time interval of the first instance.

At step 440, a first location of a station is determined, at the first instance, from the processed batch of STA reports based on SSI values.

At step 450, a new access point joining the plurality of access points is detected. The station is within RF range of the new access point.

At step 460, responsive to detecting the new access point, each of the plurality of access points is resynched, including sending a second sync event to establish a second predefined time interval for periodically sending STA reports.

At step 470, a second location of the station is determined, at a second instance of the second predefined time interval. When the station is in motion, the locations will be different, and when the station is stationary, the locations will be the same. A special case occurs when location an estimated range from less than three signals, and although having slight motion, the station remains within the estimated range. Depending on motion, and online access points at different instances in time, the station location can be based on different sets of access points. In fact, a newly online access point may have joined station locationing or an access point may have dropped offline. Because the access points remain in synch, per the current disclosure, the location is accurate.

The process returns to step 320 of FIG. 3. Note that the example of 320 assumes a resynching is necessary from a new access point detection. However, in other examples, resynching is not necessary because the access point composition remains consistent.

III. Computing Device for Access Point Synching for Locationing (FIG. 5)

FIG. 5 is a block diagram illustrating a computing device 500 for use in the system 100 of FIGS. 1A and 1B, according to one embodiment. The computing device 500 is a non-limiting example device for implementing each of the components of the system 100, including the locationing server 110, the access points 120A-C, and the station 130. Additionally, the computing device 500 is merely an example implementation itself, since the system 100 can also be fully or partially implemented with laptop computers, tablet computers, smart cell phones, Internet access applications, and the like.

The computing device 500, of the present embodiment, includes a memory 510, a processor 520, a hard drive 530, and an I/O port 540. Each of the components is coupled for electronic communication via a bus 550. Communication can be digital and/or analog, and use any suitable protocol.

The memory 510 further comprises network access applications 512 and an operating system 514. Network access applications can include 512 a web browser, a mobile access application, an access application that uses networking, a remote access application executing locally, a network protocol access application, a network management access application, a network routing access applications, or the like.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for access applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer ⅔ routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a locationing server, on a data communication network and communicatively coupled with a plurality of access points, for synching the plurality of access points to accurately track locations of stations within a combined radio frequency (RF) range of the plurality of access points, the method comprising:

receiving location coordinates for each of the plurality of access points;

synching the plurality of access points with a first synch event to establish a first predefined time interval for periodically sending station (STA) reports;

periodically receiving a batch of STA reports from the plurality of access points according the first predefined time interval, wherein each of the STA reports includes a time stamp, a list of MAC addresses for stations within RF range and a signal strength indicator (SSI) value measured for each of the stations;

processing the batch of STA reports for a specific instance of the first predefined time interval, including accepting STA reports having a time stamp that matches the predefined time interval of the first instance, and disregarding STA reports having a time stamp that does not match the predefined time interval of the first instance;

determining a first location of a station, at the first instance, from the processed batch of STA reports based on SSI values;

detecting a new access point joining the plurality of access points, wherein the station is within RF range of the new access point;

responsive to detecting the new access point, resynching each of the plurality of access points, including sending a second sync event to establish a second predefined time interval for periodically sending STA reports;

determining a second location of the station, at a second instance of the second predefined time interval; and displaying a real-time mapping of the station using a first location at the first instance and a second location at the second instance.

2. The method of claim 1, wherein the station location is based on at least two STA reports.

3. The method of claim 1, wherein the station location is based on at least three STA reports.

4. The method of claim 1, wherein the first location is determined from STA reports associated with a first group from the plurality of access points and the second location is determined from STA reports associated with a second group from the plurality of access points, wherein the first group is distinct from second group.

5. The method of claim 1, further comprising processing analytics for the station based on the first and second locations.

6. A non-transitory computer-readable medium in a locationing server, on a data communication network and communicatively coupled with a plurality of access points, for synching the plurality of access points to accurately track locations of stations within a combined radio frequency (RF) range of the plurality of access points, the method comprising:

receiving location coordinates for each of the plurality of access points;

synching the plurality of access points with a first synch event to establish a first predefined time interval for periodically sending station (STA) reports;

periodically receiving a batch of STA reports from the plurality of access points according the first predefined time interval, wherein each of the STA reports includes a time stamp, a list of MAC addresses for stations within RF range and a signal strength indicator (SSI) value measured for each of the stations;

processing the batch of STA reports for a specific instance of the first predefined time interval, including accepting STA reports having a time stamp that matches the predefined time interval of the first instance, and disregarding STA reports having a time stamp that does not match the predefined time interval of the first instance;

determining a first location of a station, at the first instance, from the processed batch of STA reports based on SSI values;

detecting a new access point joining the plurality of access points, wherein the station is within RF range of the new access point;

responsive to detecting the new access point, resynching each of the plurality of access points, including sending a second sync event to establish a second predefined time interval for periodically sending STA reports;

determining a second location of the station, at a second instance of the second predefined time interval; and displaying a real-time mapping of the station using a first location at the first instance and a second location at the second instance.

7. A locationing server, on a data communication network and communicatively coupled with a plurality of access points, for synching the plurality of access points to accurately track locations of stations within a combined radio frequency (RF) range of the plurality of access points, the locationing server comprising:

a processor;

a network interface communicatively coupled to the processor and to the WLAN; and a memory, communicatively coupled to the processor and storing:

a mapping module, receiving location coordinates for each of the plurality of access points;

a synching module to synch the plurality of access points with a first synch event to establish a first predefined time interval for periodically sending STA reports;

a STA report module to periodically receiving a batch of STA reports from the plurality of access points according the first predefined time interval, wherein each of the STA reports includes a time stamp, a list of MAC addresses for stations within RF range and a signal strength indicator (SSI) value measured for each of the stations, wherein the STA report module processes the batch of STA reports for a specific instance of the first predefined time interval, including accepting STA reports having a time stamp that matches the predefined time interval of the first instance, and disregarding STA reports having a time stamp that does not match the predefined time interval of the first instance;

a STA tracking module to determine a first location of a station, at the first instance, from the processed batch of STA reports based on SSI values, wherein the synching module detects a new access point joining the plurality of access points, wherein the station is within RF range of the new access point, wherein the synching module, responsive to detecting the new access point, resynchs each of the plurality of access points, including sending a second sync event to establish a second predefined time interval for periodically sending STA reports, wherein the STA tracking module determines a second location of the station, at a second instance of the second predefined time interval, wherein the mapping module displays a real-time mapping of the station using a first location at the first instance and a second location at the second instance.

\* \* \* \* \*